July 14, 1953  E. SCHEEMAEKER  2,645,349
CREAM SEPARATOR AND CAP
Filed March 7, 1949  2 Sheets-Sheet 1
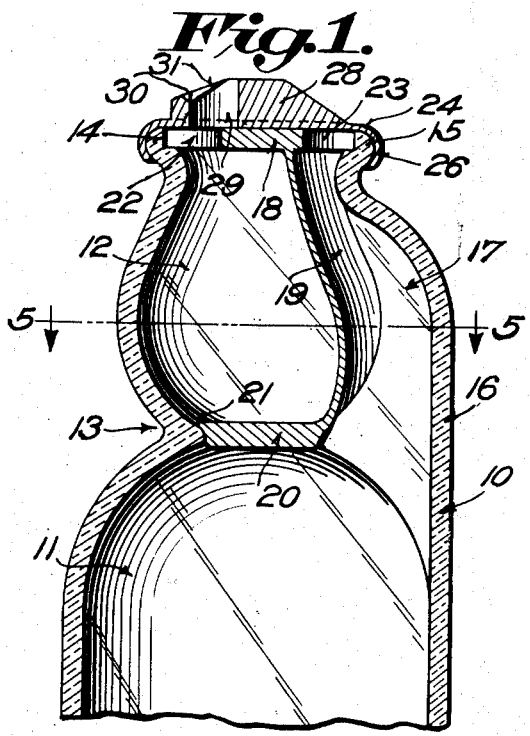
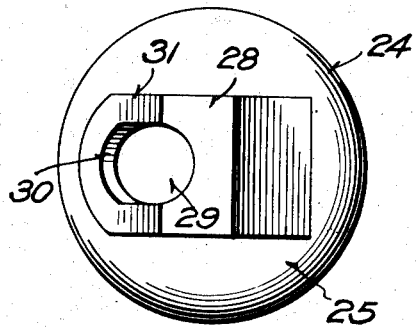
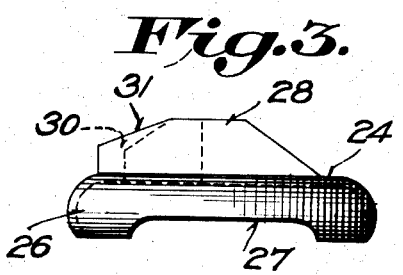
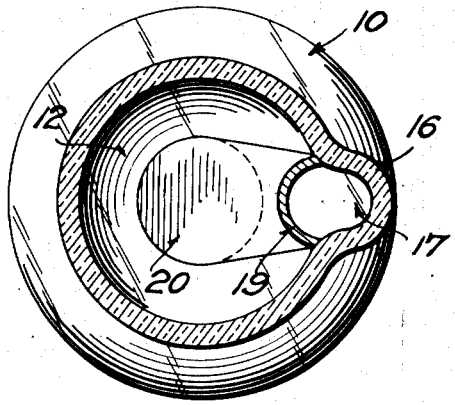
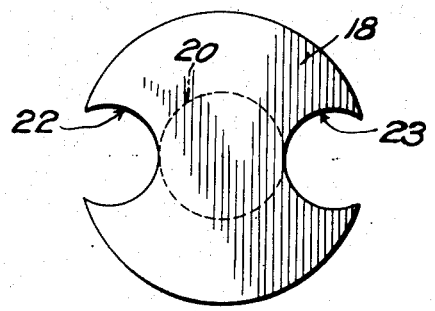
INVENTOR.
EMILE SCHEEMAEKER,
BY
Vernon A. Dorsey
ATTORNEY July 14, 1953  E. SCHEEMAEKER  2,645,349
CREAM SEPARATOR AND CAP
Filed March 7, 1949  2 Sheets-Sheet 2
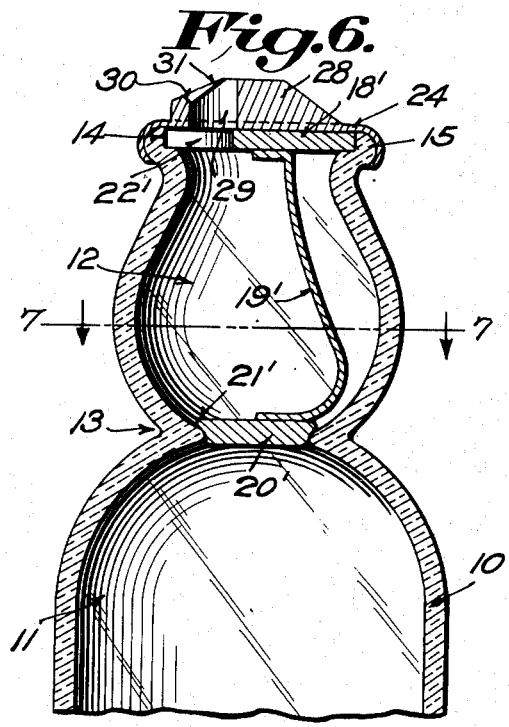
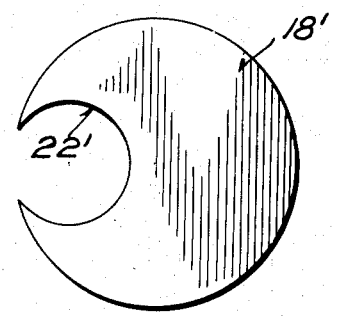
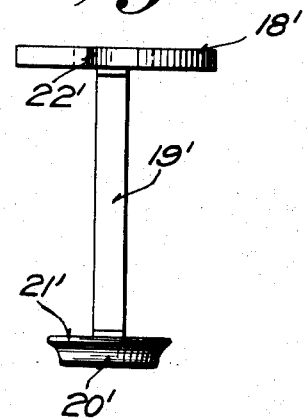
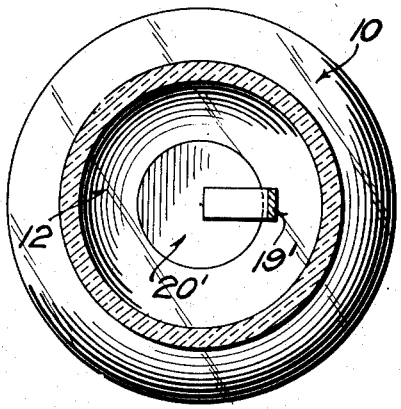
INVENTOR.
EMILE SCHEEMAEKER,
BY
Vernon A. Dorsey
ATTORNEY Patented July 14, 1953

2,645,349

UNITED STATES PATENT OFFICE 2,645,349

CREAM SEPARATOR AND CAP

Emile Scheemaeker, Woonsocket, R. I.

Application March 7, 1949, Serial No. 79,993

1 Claim. (Cl. 210—51.5)

This invention relates to provisions for separating liquids of different specific gravity and more particularly to a device to be placed in a milk bottle for separating the lighter risen cream from the heavier precipitated milk and enabling the pouring and removal of the cream and milk apart from each other.

The present invention has more especially to do with the improvement of the device and means of the invention set forth in the prior Patent No. 2,134,090 issued to the present inventor and is a result of the development of such device and means in perfecting and making the same more efficient and practical for household use as well as minimizing the number of separate parts and facilitating the manufacture of the device as a commercial product.

An object of the present invention is not only to improve directly upon the device and means of said prior patent but to improve upon cream separator devices generally as applied to all milk bottles of the cream top type and used regularly in delivery of the commodity by dairies.

Other objects and advantages to be attained will appear more fully in the following description.

In the accompanying drawings illustrative of the invention but not in specific limitation thereof, Figure 1 is a fragmentary vertical sectional view of a modified cream top milk bottle in which there is an offset channeled passageway at the side of the upper cream chamber and through which the milk from the lower milk chamber can be poured separate and apart from the cream that has risen from the milk and collected in the cream chamber, the bottle having set therein an improved separator device including a stationary integral stopper disk notched for liquid outlet, with a movably mounted closure and flow controlling cap placed externally in covering relation to the mouth of the bottle;

Figure 2 is a top plan view of the cap element on an enlarged scale and detached from the bottle;

Figure 3 is a side elevation of the cap element;

Figure 4 is a top plan view of the stopper disk of the separator device shown in Figure 1;

Figure 5 is a cross section on the line 5—5 of Figure 1;

Figure 6 is a fragmentary sectional view similar to that of Figure 1 but showing a modified form of separator device as applied in an ordinary cream top bottle not having a by-pass passageway at the side of the upper cream chamber for the milk from the lower milk chamber;

Figure 7 is a cross section on the line 7—7 of Figure 6;

Figure 8 is a top plan view of the stopper disk of the separator device of Figure 6, on an enlarged scale; and Figure 9 is a front elevation of the separator device of Figure 6, but removed from the bottle.

Generally stated, the particular milk bottles to which the separator provision and means of the present invention is adaptable in use are substantially identical in that they each and all have a lower chamber proper comprising the major portion of the bottle and an upper portion of the bottle of lesser capacity constituting the cream chamber, with an opening of communication provided in a reduced necked-in portion of the bottle between the chambers, and the cream chamber usually having its wall bulging or bulbous between its top and bottom.

In all of these bottles, regardless of size and capacity for contents, the opening of communication in the reduced or necked-in portion of the bottle between the upper and lower chambers is of one and the same size. So, too, the mouth opening and surrounding wall edge portion in each and all of the bottles is of one and the same form and size in standardization for convenience in bottling milk with uniform stoppers or closure elements and capping provision by the use of automatic machinery as well as for the washing and cleansing of the bottles.

Otherwise, the bottles differ appreciably only in the specific form and character of the upper cream chamber portion, that is to say, the one modified style of bottle has the laterally offset milk passage at the side of the cream chamber as indicated in Figures 1 and 5 of the drawings, while the ordinary style bottle illustrated in Figures 6 and 7 has a plain bulbous cream chamber portion and no separate by-pass passage for milk from the chamber below.

It may be here stated at this time that the separator and closure provision of the present invention is, in a broad sense, adjustable effectively and efficiently to both types of bottle.

Specifically and referring first more particularly to the showing in Figures 1 through 5 of the drawings, the numeral 10 designates a milk bottle in the lower portion of which is the milk chamber proper 11 of larger capacity. Above this chamber 11 is a chamber 12 of somewhat smaller capacity, which may be termed the cream chamber because, after the bottle is originally filled with milk up to a level near the mouth of the bottle and allowed to stand for a while, the cream gradually but rather quickly rises and collects as a separate quantity in the chamber 12.

As indicated in Figure 1, the cream chamber portion 12 is generally bulbous in form, of lesser diameter than the lower milk chamber portion 11, and the two chambers are connected communicably by an appreciably restricted opening provided in a reduced and necked-in portion 13 of the bottle where the said chambered portions 11 and 12 are joined.

The contracted mouth portion of the bottle, as shown, is of a little larger diameter than the opening in the reduced and necked-in portion 13. This mouth portion is formed with the usual internal annularly shouldered seat 14 into which the regular disk-like stopper (not shown because obvious) usually of waterproofed paper board, is inserted with a tight and retentive fit when the bottle is filled, at the dairy or other place of filling. Also, as usual, the immediate edge portion surrounding the mouth of the bottle is beaded or rounded externally in cross section, as at 15.

In the form shown in Figures 1 and 5, the bottle is provided with an interiorly open channeled and laterally offset rib portion 16 affording a longitudinal milk by-passing passageway 17 communicating at its inner end with the lower milk chamber 11 and at its outer end with the mouth of the bottle. This passageway 17, at its normally open longitudinal side, is normally in direct communication throughout with said cream chamber 12. However, when the separator device of the present invention is applied to the bottle, as herein later described, the passageway is closed off from the cream chamber.

For application to the style of bottle shown in Figures 1 and 2 and just above described, the separator device comprises a disk-like member 18 which is inserted in the annularly shouldered seat 14 in place of the regular stopper disk which is obviously removed at the time. This member 18 has depending integrally therefrom an elongated narrow tongue member 19 which is of characteristic compound curvature longitudinally, corresponding to the interior curvature of the bulbous cream chamber 12 and it is of a curved channeled cross section (see Figures 1 and 5) so as to cover the milk passage channel 17 and, with leaktight edge contact throughout its length, thus partitions the passageway 17 off from the cream chamber.

This tongue member 19 has attached to its lower end a disk-like member 20 which extends horizontally and angularly therefrom so as to engage in and close the opening of communication in the reduced and necked-in portion 13 of the bottle between the lower milk chamber 11 and the upper cream chamber 12. As shown, this disk-like member 20 is tapered slightly wedge-shape marginally, and, at its upper edge, is provided with a slightly projected annular flange 21 to prevent the member from slipping entirely through the opening of communication between the cream chamber and the milk chamber and to assure a more effective closing of the opening.

As shown in Figures 1 and 4, the member 18 is provided with a marginal notch 22 and a diametrically opposite notch 23, the notch 22, when the member 18 is set into the seat 14 of the bottle, providing an outlet opening for the cream chamber 12 and the notch 23 an outlet opening for the milk passageway 17.

It is here noted that the unitary integral structure of the separator device, including the three members 18, 19 and 20, is an important and advantageous feature of the present invention in that, in addition to the minimization in number of parts and an elimination of loose and separable parts, the structure is such that the member 18, fitting tightly though removably, as it does in the seat 14 of the bottle, and the tongue 19 being of proper length, as well as form, the disk 20 is set and held seated with closing effect in the opening of communication between the lower milk chamber 11 and the upper cream chamber 12. This is of material advantage because there is no liability such as misplacing and losing detached parts, and the form and arrangement of the simplified unitary structure makes its application to the bottle easy. So, too, the placing of the disk-like member 18 in the seat at the mouth of the bottle assures an automatic seating of the closure disk 20 in the opening of communication in the necked-in portion of the bottle. Moreover, in placing the disk-like member 18 in the mouth of the bottle, the channeled passageway 17 is visible so that the tongue member 19 is easily positioned in the cream chamber 12 to cover the passageway and close it off from said chamber.

In Figures 6 through 9 of the drawings, there is shown an adaptation of the present invention for use with an ordinary cream top bottle wherein the cream chamber 12 is plain bulbous and the milk passageway 17 of Figures 1 and 5 is eliminated (see Figures 6 and 7). In this adaptation the separator device is quite similar to that hereinbefore described except that, in the present modification, the disk-like member 18' which is fitted to the seat 14 in the mouth of the bottle has only a single marginal notch 22' which serves as an outlet opening for the cream chamber 12, and the closure disk 20' for the opening of communication in the necked-in portion 13 of the bottle is connected to the under side of the disk-like member 18' by a longitudinally compound curved spring tongue 19' (see Figures 6 and 9).

This modified separator device is effective in closing off the upper cream chamber from the lower milk chamber like the herein above described other device. However, in this modification, inasmuch as there is no by-pass passageway 17 from the milk chamber 11, the cream in the chamber 12 has to be first poured off through the outlet opening 22' before the disk-like member 18' is removed to either withdraw the separator entirely from the bottle or else far enough to lift the disk member 20' clear of the opening of communication sufficiently to permit pouring of the milk from the chamber 11.

Obviously, however, it is possible to modify the separator device of the present invention so that it can be applied to the ordinary cream top bottle having the plain bulbous upper cream chamber as shown in Figures 6 and 7 without the channeled rib offset 16, by merely changing the form of the tongue member 19 in its longitudinal compound curvature, as indicated in Figures 5 and 6 of the present inventor's prior Patent No. 2,134,090, hereinbefore referred to, so as to conform marginally to the interior surface contour of the cream chamber; and, by making the arcuate channeling of the part 19 deep enough to produce a by-pass passageway of ample cross area to readily conduct milk as it is poured from the lower milk chamber 11 without first pouring the cream from the upper chamber 12.

It is, of course, understood that the necking-in of the bottle, as at 13, is at or in close proximity to the cream line so that practically all of the cream that has risen from the milk in the bottle, which is originally filled nearly to the mouth thereof, is contained in the cream chamber 12, and that the separator device is not placed in the bottle until after the content of the chamber is all cream.

It is here further noted that the separator unit itself may be made of suitable non-corrosive metal, a plastic or other approved material, of form retentive quality and which is cleansible and maintainable in sanitary conditions, and will not affect the taste of the milk or cream or impart an undesirable odor thereto.

For use with the separator device of the present invention, which is readily applied to and removed from the bottle, at will, a special cap element 24 is provided on the bottle with removability and rotatability in its mounting, said cap element being adapted in one of its rotated positions to close the outlet opening or openings in the disk-like member 18 or 18', as the case may be, and having a pouring opening to be brought into registration with a selected one of the outlet openings by rotating the cap element into proper position for the purpose.

This cap element 24, illustrated in detail in Figures 1, 2, 3 and 6 of the drawings, is the same in construction and arrangement for both adaptations of the invention shown. Hence, a description of one cap element will suffice for an understanding of the structure and its function.

As shown, the cap element comprises a circular body plate portion 25 (see Figure 2). This plate portion has an annular downturned flange 26 which is curved in cross section to fit retentively but rotatably over the beaded mouth portion 15 of the bottle.

To enable the springing and snapping of the flange 26 of said plate portion 25 into fitted engagement over the bead 15, said flange 26 is cut out, as at 27, at two or more places (usually three places, symmetrically, in practice but not thereby limited) so that the retained and unmutilated segments of the flange will spread outwardly under applied force and spring back with slight underhang on the bead 15 after the applied pressure on the cap element is released.

In this way, the cap element 24 is frictionally held rotatably on the bottle as indicated in Figures 1 and 6, and it is easily snapped into place and as easily sprung from the bottle at will.

Extending diametrically across the top face of the plate portion 25 is a polygonal lug or button-like thickened portion 28 which may be grasped for leverage in turning the cap element on the bottle. This portion 28 also reinforces and stiffens the major body part of the plate 25, the remainder of which may be of comparatively thin gauge material, either metallic or a suitable plastic possessing requisite strength for durability and being somewhat resilient in character.

A discharge opening 29 is provided in the cap element 24, and, as shown, it extends through the thickened lug or button-like portion 28. This opening 29 is arranged so that, by rotation of the cap element on the bottle, the opening may be brought selectively in working relation to either the outlet opening 22 or the other one 23 of the disk-like member 18 or the opening 22' of the member 18', as the case may be. Said discharge opening 29, as shown, has its forward upper edge portion beveled reversely rearward, as at 30, where the opening cuts through the forwardly and downwardly inclined top face portion 31 of the lug or button-like enlargement 28 of the cap element. This is to produce a flow controlling and pouring lip from the cap element.

It will thus be seen that a practical closure cap is provided for use on the bottle in cooperative association with the cream separator device of the present invention, whether the bottle be of the ordinary cream top type or the modified type wherein the by-pass passageway 17 is provided.

It is also apparent that the cap element 24 is capable of use as a safe and ample closure for the bottle as well as enabling the pouring of the contents, while, at the same time, it is easily applied to and removed from the bottle; and, like the separator device itself, it is easily cleansed and maintained in a sanitary condition.

In addition to the foregoing advantages, the construction and arrangement of both the separator device and the cap element is such as to make for ideal simplicity and practicability of structure and minimization in cost of production.

Obviously, while the illustrated and herein described construction and arrangement is the result of development, improvement and practical embodiment, the same is not in limitation of the invention, as further modification and change is possible within the spirit and scope of the appended claim.

What is claimed is:

A milk and cream separator for use in cream top milk bottles having a lower milk chamber proper and a superposed cream chamber with an opening in communication between them, an applied cream separator device, as a unit in itself, having a disk shaped stopper member having an opening therein fitting detachably into an internal seat provided in the mouth of the milk bottle and supporting the rest of the cream separator unit within the bottle, the milk bottle having an externally-beaded mouth-edge-portion, a cap element detachably applicable on the bottle with rotatable retentive fitting marginally upon the beaded mouth portion of the bottle, said cap element having an outlet opening for removal of the liquid contents of the bottle, said opening being formed in one end of a thickened lug extending longitudinally over the top of said cap element, the body portion of the cap element directly overlying and movable in contiguity over the stopper member normally in closing relation to the outlet opening of said member, said discharge opening to register communicably with the outlet opening of the stopper member by rotating the cap element by said thickened upstanding lug to position the discharge opening.

EMILE SCHEEMAEKER.

References Cited in the file of this patent

UNITED STATES PATENTS

| Number | Name | Date |
|---|---|---|
| 1,282,103 | Moffat | Oct. 22, 1918 |
| 1,446,751 | Kadavy | Feb. 27, 1923 |
| 1,448,967 | Klein | Mar. 20, 1923 |
| 1,685,147 | Case | Sept. 25, 1928 |
| 1,811,113 | Derby | June 23, 1931 |
| 2,134,090 | Scheemaeker | Oct. 25, 1938 |
| 2,180,582 | Crane | Nov. 21, 1939 |
| 2,188,184 | Hogg | Jan. 23, 1940 |
| 2,241,044 | Steinberg | May 6, 1941 |
| 2,315,178 | Oroney | Mar. 30, 1943 |
| 2,488,120 | Ferriday | Nov. 15, 1949 |